June 29, 1965     N. B. SMOKER     3,191,582
FEEDER FOR STOCK ANIMALS
Original Filed Oct. 25, 1963
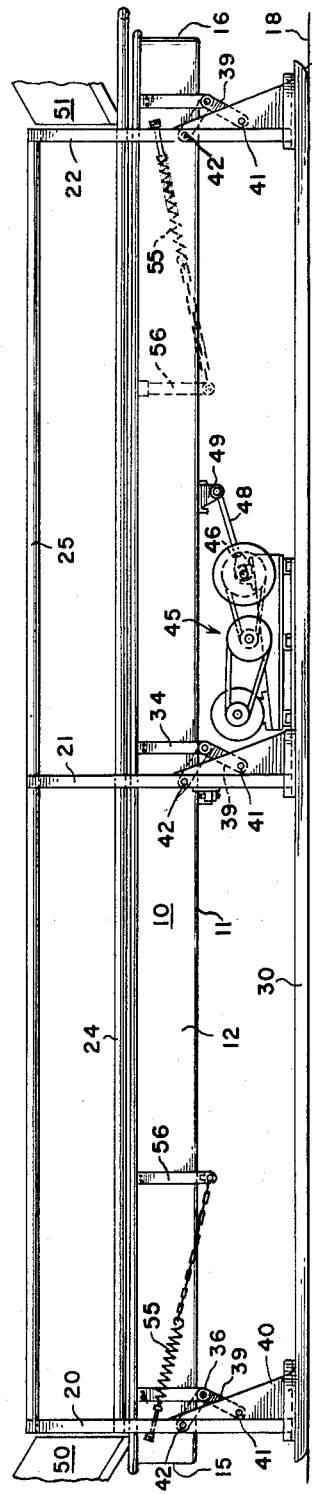
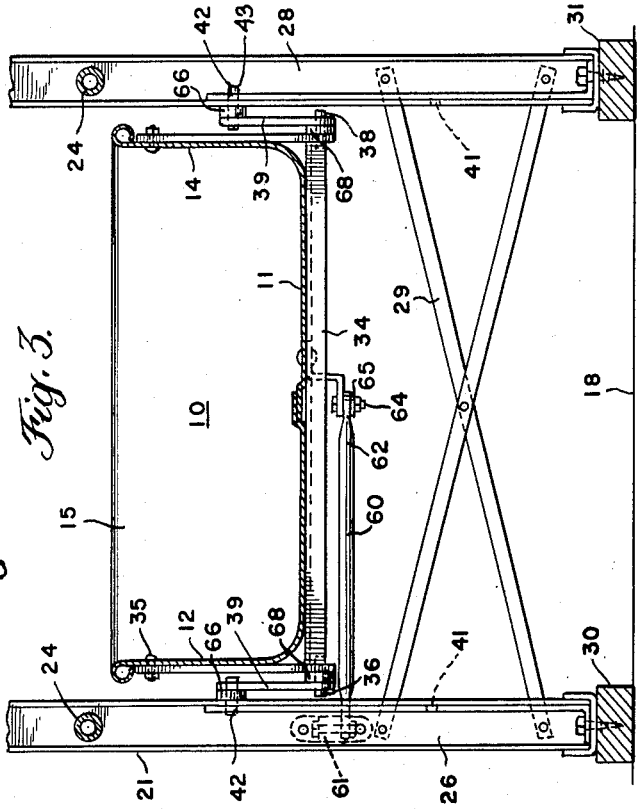
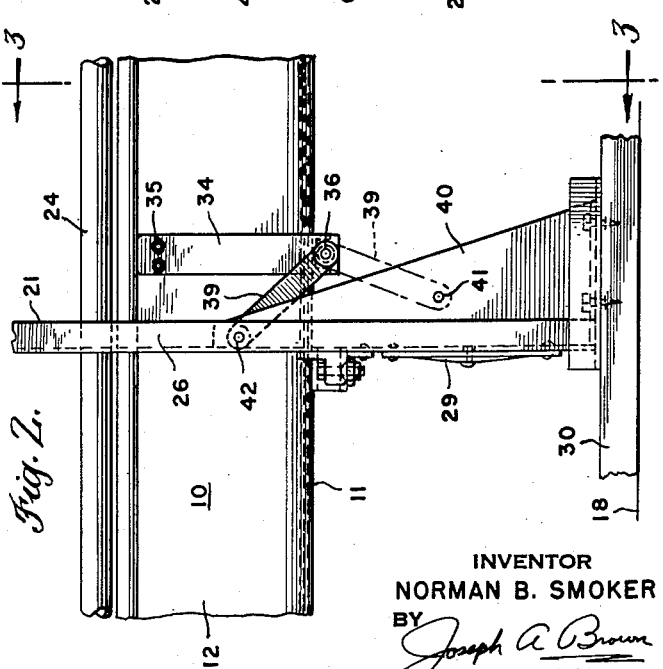
INVENTOR
NORMAN B. SMOKER
BY
*Joseph A. Brown*
ATTORNEY

United States Patent Office 3,191,582
Patented June 29, 1965

3,191,582
FEEDER FOR STOCK ANIMALS
Norman B. Smoker, Intercourse, Pa., assignor to Sperry Rand Corporation, New Holland, Pa., a corporation of Delaware
Continuation of application Ser. No. 319,043, Oct. 25, 1963. This application Oct. 5, 1964, Ser. No. 405,002
1 Claim. (Cl. 119—61)

This application is a continuation of application Serial Number 319, 043, filed October 25, 1963, now abandoned.

This invention relates generally to equipment for delivering feed to stock animals. More particularly, the invention relates to improvements in the Feeder for Stock Animals shown and described in U.S. Patent No. 3,092,077.

In farming operations where stock animals such as steers are fed, the feeding apparatus is usually permanently and fixedly located. One end of the feeder is commonly situated in a given location accessible to a supply source of feed. Such source might be the discharge outlet of a silo chute or the end of a conveyor which transports bales or other material to the feeder.

For convenience and versatility, some farmsteads prefer feeder devices which can be readily shifted from one location to another. When small size storage units are employed and located in various places about a farmstead, it is practiced to place the feeder adjacent one unit until it has been emptied and then to move the feeder to another feed supply source. Moving the feeder to a new location provides for an uninterrupted supply of feed and enables a convenient cleanup operation around the old feeder location.

If a stock feeder can convey feed material in one direction only, then a given inlet end of the feeder always has to be located adjacent the feed supply source. The opposite end of the feeder may not be so located. This presents problems where the feeder is intended to be moved from one location to another. Even when the feeder apparatus is to be fixedly located, for example with one end of the feeder at one silo and the other end adjacent another silo, it is desirable to have a feeder which will operate in two directions because then feed can be used from either silo without having to turn the feeder around.

One object of this invention is to provide a stock feeder so designed that it may be used selectively to convey feed in one direction or in opposite direction.

Another object of this invention is to provide an elongated unitary stock feeder which may be readily moved from one location to another about a farmstead.

A further object of this invention is to provide a stock feeder of the character described which is so designed and operable that feed may be deposited in the feeder at either end.

A still further object of this invention is to provide a stock feeder of the character described wherein the foregoing objects are obtained with the structure which is simple and relatively inexpensive.

Other objects of this invention will be apparent hereinafter from the specification and from the recital in the appended claim.

In the drawing:

FIG. 1 is a side elevation of a stock feeder constructed according to this invention, the trough of the feeder being supported by a spring and link arrangement shown in solid lines to convey feed from left to right, and in dotted lines to convey feed from right to left;

FIG. 2 is an enlarged fragmentary side elevation of a portion of the feeder and showing one of the support links for the feeder trough in solid line position whereby feed is adapted to be conveyed from right to left, and in dotted position for left to right conveyance; and FIG. 3 is a transverse vertical section taken on the line 3—3 of FIG. 2 looking in the direction of the arrows.

Referring now to the drawing by numerals of reference, 10 denotes a feed trough having a bottom wall 11, upstanding vertical side walls 12 and 14, and vertical end walls 15 and 16. Trough 10 is elongated and it extends horizontally relative to the ground 18. The trough 10 provides a receptacle from which the animals feed and in which feed may be vibrated and conveyed from one end of the trough to the other.

For supporting trough 10, support stands 20, 21 and 22 are provided and spaced relative to each other along the length of the trough. Support 20 is adjacent end wall 15 of the trough, support 21 is adjacent the middle and support 22 adjacent end wall 16. The stands are interconnected by a pair of bottom rails 24 and a pair of top rails 25 extending longitudinally. One rail of each pair is located on one side of trough 10 and the other rail at the opposite side. The top rails are vertically spaced from the bottom rails to provide openings through which the animals may project their heads to feed from the trough. The rails 24 are slightly above the top edge of trough 10 and laterally displaced outwardly therefrom as shown best in FIG. 3 to prevent the animals from leaning against the trough when they feed from it.

All of the supports are similarly constructed. The details of the structure of support 21 are shown in FIGS. 2 and 3. Support 21 comprises a pair of upright channel members 26 and 28 on opposite sides respectively of the trough. These upright members are interconnected by a transverse X-brace 29 located beneath trough 10. At their lower ends, the upright supports are fastened to longitudinal wooden skids 30 and 31 which are disposed parallel to each other and to the extension of the trough 10. At their terminal ends, the skids are curved and turned upwardly at 32. By attaching a chain or cable to one of the end supports of the feeder and the opposite end to a tractor, the apparatus may be dragged over the ground 18 and positioned in any desired location. The skids provide a sled support for the trough.

At each support stand, trough 10 seats in a U-shaped bracket 34 and is connected to its by bolts 35. Each bracket 34 provides pivotal connection pins 36 and 38 at the bottom of trough 10 for a pair of support links 39, one on each side of the trough. The support stand adjacent each pair of links has a gusset 40 on each vertical side member and providing a pivotal connection point 41. A second connection point is provided at 42 on each side member, as shown. Pins 43 are provided on links 39 for use in pivotally attaching the links to the support stands.

When trough 10 is supported with the links attached to connection points 41, as shown in the solid line positions of the links in FIG. 1 and in the dotted position of FIG. 2, a pair of tension springs is provided, one of which is shown at 55. The springs are connected between support stand 20 and a bracket 56 detachably fastened to trough 10. This spring-biases the trough toward the left of FIG. 1 and keeps links 39 from collapsing in a clockwise direction. When trough 10 is supported with the links 39 in the dotted position of FIG. 1 and the solid line position of FIG. 2 the bracket 56 and springs 55 must be removed and installed at the opposite or right hand end of the trough as shown in dotted lines in FIG. 1. This biases the trough toward the right and again prevents links 39 from collapsing.

When the links 39 are pivotally connected by pins 43 to the set of connection points provided by the set of connection points 41, as shown in solid lines in FIG. 1 and with the springs 55 at the left end of the trough, material deposited in trough 10 from a shute 50 will be fed from left to right. However, when the links 39 are connected by pins 43 to the set of connection points 42, as shown in dotted lines in FIG. 1 and with springs 55 at the right end of trough 10, then feed deposited in the trough through a chute 51 is adapted to be conveyed from right to left.

The conveyance of feed results from vibrating and longitudinally reciprocating trough 10 in its entirety. Such vibrating conveyance of feed is accomplished by a drive unit 45 beneath the trough and supported on the skids 30 and 31. An eccentric 36 is connected by a rod 48 to the bottom of the trough 10 at 49. The eccentric reciprocates rod 48 which in turn transmits such motion to the trough so that the trough in its entirety vibrates. Lateral movement of the trough is resisted by stabilizer link 60. One end 61 of link 60 is pivotally connected to support stand 21. The opposite end 62 of link 60 is pivotally connected at 64 to the bottom of trough 10. Connection 64 includes a rubber bushing 65. In addition, rubber bushings are provided at 66 and 68 between links 39 and the support stands and between the links and trough 10. The bushings provide a resilient linking of the trough to the support stands and to the drive whereby a stable relationship results. However, the trough may be constructed without such bushings by merely providing sufficent operating clearance between the various parts to allow trough 10 to reciprocate and for stabilizer link 60 to oscillate. In practice, when trough 10 is operated, the longitudinal movement of the trough is less than an inch and the up and down movement is only about a quarter of an inch.

It will thus be seen that the vibrating feeder provided by this invention can be moved on the skids 30 and 31 to any desired location in a farmstead. When located as desired, either end of the trough 10 may be employed to receive feed from a supply source. If the feed is to enter the trough over the end wall 15, then the links 39 are positioned as shown in solid lines in FIG. 1 and with springs 55 at the left. If the feed is to be deposited in the trough over the end wall 16, then the links 39 are shifted to the dotted position of FIG. 1 and springs 55 are moved to the right. Thus, using the connection points 41, FIG. 1, feed is conveyed to the right and using the connection points 42, FIG. 2, feed is conveyed toward the left.

While this invention has been described in connection with a particular embodiment thereof, it will be understood that it is capable of modification, and this application is intended to cover any variation, uses, or adaptations following, in general, the principles of the invention and including such departures from the present disclosure as come within known or customary practice in the art to which the invention pertains, and as fall within the scope of the invention or the limits of the appended claim.

Having thus described my invention, what I claim is:

A feeder unit adapted to be situated in plural locations about a farmstead to feed steers and other stock animals and comprising, in combination, an elongated horizontally extending trough from which the animals feed, such trough having a bottom wall and upstanding side and end walls integral therewith and forming a unitary feed receptacle, a sled carrying said trough for sliding transport over the ground, said sled having trough supports spaced relative to each other along the length of the trough, side rails interconnecting said supports and located above and laterally outwardly of the trough, a pair of links connecting each support to said trough, each pair of links having ends pivotally connected to given locations on opposite sides of the trough and opposite ends of the links being connected to its associated support, said supports each providing two sets of connecting points for said links and selectively useable, spring means yieldably holding said trough in a given normal position relative to said supports, power means carried on said sled and connected to said trough to longitudinally reciprocate and vibrate the trough in its entirety, feed deposited in one end of said trough being vibrated and conveyed toward the opposite end of the trough when said links are connected to one set of said connecting points, feed deposited in said opposite end of said trough being vibrated and conveyed toward said one end of the trough when said links are connected to the other set of said connecting points, whereby when the feeder is moved about the farmstead either end of the trough may be located at a feed supply source, and the position of said trough relative to said side rails and said supports remaining the same regardless of which set of connection points said links are connected.

References Cited by the Examiner

UNITED STATES PATENTS 1,447,507    3/23    Becker _____ 198—220
3,015,308    1/62    Beresford _____ 119—61

SAMUEL KOREN, *Primary Examiner.*

HUGH R. CHAMBLEE, *Examiner.*